3,595,607
APPARATUS FOR ODORIZING AN AIRSTREAM
Kenneth W. Gores, Bellevue, Wash., assignor to
Kirkman Laboratories, Inc., Portland, Oreg.
Filed Jan. 21, 1969, Ser. No. 792,374
Int. Cl. A61l 9/04, 9/00
U.S. Cl. 21—74                                                        3 Claims

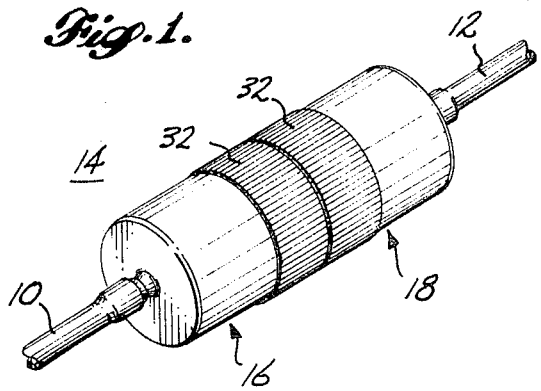
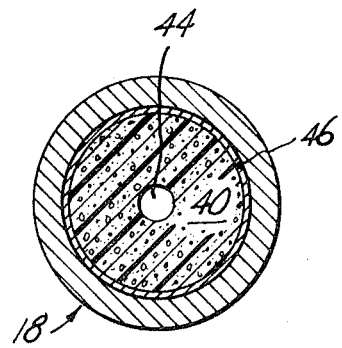
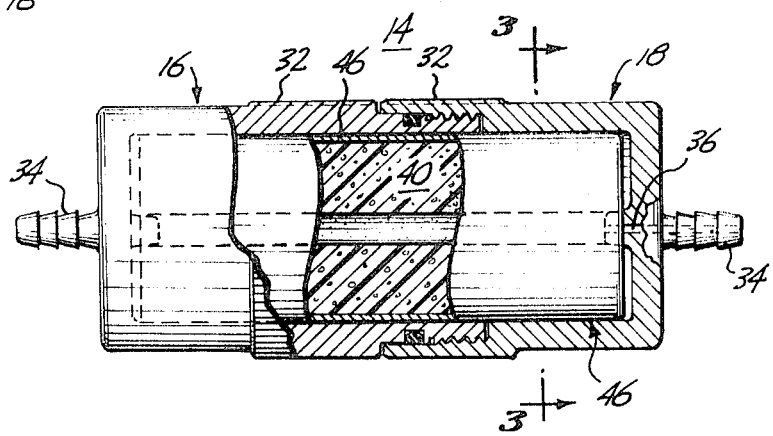
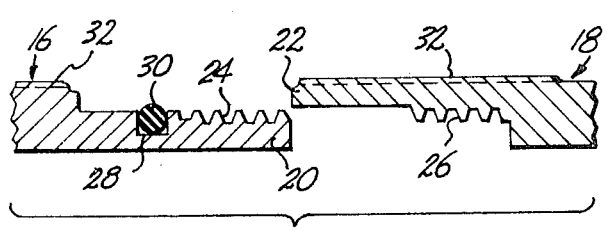
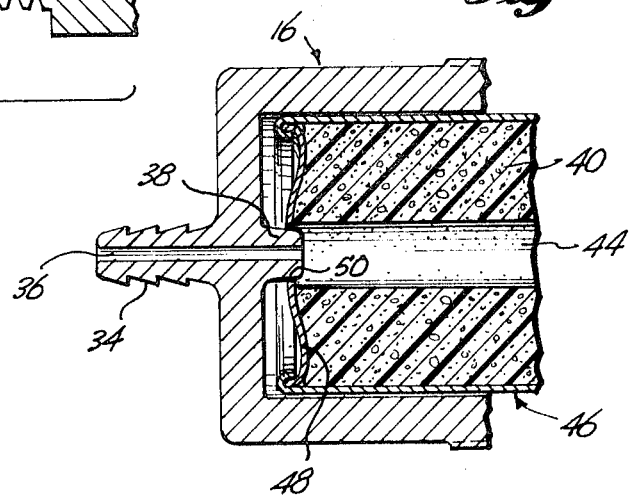
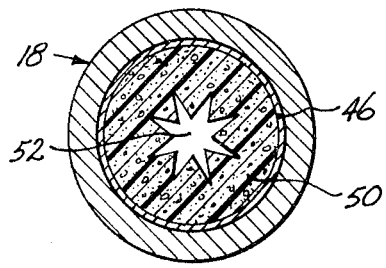
INVENTOR
KENNETH W. GORES
BY Ford E. Smith
ATTORNEY United States Patent Office 3,595,607
Patented July 27, 1971

ABSTRACT OF THE DISCLOSURE

Apparatus is provided for imparting an agreeable odor to an airstream for the purpose of masking or neutralizing disagreeable odors that may be present or encountered. The apparatus comprises a casing consisting of two mating parts removably joined at the midpoint of the casing and having hollow stems at opposite ends thereof to permit operative coupling of the casing in a flexible air-handling conduit. Disposed within the casing is a porous body of cellular material substantially filling the casing and having a longitudinal air passage aligned with the hollow stems. Instanding bosses mounted on the casing interior orient the longitudinal passage into alignment with adit and exit openings formed by the hollow stems.

SUMMARY OF THE INVENTION

In dentistry disagreeable odors are encountered at or in the oral cavity, the causes of which may be manifold. A typical problem arises with high-speed dental handpieces, especially where the air is discharged close to a patient's nose. Other instances occur in the use of a chip air syringe or other air-operated equipment. Two-part means forming an airtight chamber adapted to be let into an air conduit to pass the medium therethrough is provided. The chamber-forming means is readily separable for the removal and replacement of an element that carries a flavoring substance. The adit and exit openings of the chamber are separated. A passage extends through the carrier element between said openings. Thus, air under pressure enters the chamber and flows through the element passage wiping its surfaces. The element in part is formed of an absorbent material capable of receiving and carrying the flavoring substance. The absorbent material is composed of pervious cell-like structure forming a network of intercommunicating minute reservoirs into which the flavoring substance may be introduced, as by impregnation, and from which the same may, by capillary action, flow or otherwise move to the inner surface of said passage. By these means an increment of the flavoring substance is transferred to the air passage surfaces and thence to the through-flowing air to thereby impart to it an agreeable odor. As the odor-producing material is picked up by the airstream, that deeper in the absorbent material tends to flow to the inner surfaces, continuously replenishing the same until its reserve is spent. Desirably, the flavoring substances are volatile and non-toxic, with which glycolic components in varying ratios may be added for the control of volatility. Preferably the carrier element is encased to comprise a cartridge easily handled and installed or removed from the casing.

DESCRIPTION OF THE DRAWINGS

In the accompanying drawings, in which is shown a preferred form of the invention for the purposes of exemplification, FIG. 1 is a perspective view of air-treating apparatus;
FIG. 2 is an enlarged view, partially in longitudinal section, of the apparatus of FIG. 1;
FIG. 3 is a cross section taken in the plane of line 3—3 of FIG 2;
FIG. 4 is an enlarged detail in cross section showing the means whereby the two-part chamber is joined in an airtight manner;
FIG. 5 is an enlarged view in longitudinal section illustrating engagement between a contained cartridge and the casing; and
FIG. 6 is a cross section similar to FIG. 3 showing an alternative form of air passage.

DETAILED DESCRIPTION

Between conduit tubes 10 and 12, forming part of the air supply means for conducting an air stream from a source of pressurized air to the oral cavity, is mounted the apparatus 14, which, in the preferred form of the invention, comprises cylindrical casing sections 16 and 18.

Referring to FIGS. 2 and 4, it will be seen that casing section 16 has a male portion 20 and casing 18 has a female portion 22, each provided with screw elements 24 and 26, respectively. Portings 20 and 22 mate to join the parts 16 and 18. In the groove 28 of the male element 20 is an O-ring 30. As sections 16 and 18 are coupled by means of the insertion of the male element 20 into the female element 22, the mouth of the latter first slides over the O-ring 30 deforming the same in the well-known manner to effectuate a seal between parts 20 and 22. Thereupon the screw elements 24 and 16 are engaged and rotary motion of the parts 16 and 18 relative each result in the two parts being drawn closely and tightly together in a unitary and air-tight manner. To facilitate joinder of these parts, 16 and 18, on their exterior have knurlings or flutings 32.

At each of its ends, casing 14 has a fluted or stepped stem 34, located desirably in the longitudinal axis of the casing. Each stem 34 has an axial air passage 36. Either of the stems 34 may comprise an adit or an exit passage to the interior chamber of casing 14. As may best be seen in FIG. 5, the passages 36 terminate within the respective casing element 16 or 18 in a tapered or chambered boss 38.

The carrier element is a porous body 40 formed of absorbent material which substantially fills the chamber within casing 14. Body 40 has an internal passage 44 extending between its ends and between the adit and exit passages 36 of casing 14. In this preferred arrangement passages 36 at each end of the cylindrical casing 14 are disposed in the longitudinal axis. Likewise, passage 44 is arranged in body 40 in the same axis so that as air flows, e.g. between conduit 10 and conduit 12, the same passes through passage 44, wiping the surfaces of the body 40 forming said passage.

For convenience, in supplying filler body 40 as a replaceable element, the same is preferably encased in a light, rigid canister 46 of tubular shape and sized to fairly closely fit within chambered casing 14. The ends of the canister 46 are closed by caps 48, as shown in FIG. 5, each of which has a centrally located hole 50 of a size to fit over and to receive the inner end of one of the tapered bosses 38. The length of the canister 46 is such that as the casing parts 16 and 18 are assembled and screwed down, as described, the ends of the canisters are firmly seated on the bosses 38, thus insuring that air entering the chamber through the adit passage 36 passes directly into the air passage 44 and thence out the opposite or exit passage 36. Non-axial movement of air through the carrier element is thus limited or precluded.

The size of passage 44 relative to passages 36, 36 is such that it has a substantially greater surface from which volatile flavoring substances may be transferred to the through-moving air stream.

Based on present information, a desirable carrier element 40 is formed of polyurethane foam, which is cellular and porous. Porosity in the range of between about 46 pores per lineal inch and about 60 pores per lineal inch has proved quite satisfactory, both for the purpose of receiving and retaining a volatile oil and for the purpose of imparting or transferring the same to the through-flowing airstream within passage 44.

Non-toxic, volatile, flavoring substances selected from a group such as the aromatic essential oils and others of like nature have proved to be very satisfactory as the additive to the absorbent body 40. The function of the flavoring substances is such that, as they are picked up by or transferred to the airstream, they impart an agreeable odor to the air. When the air is discharged in close proximity to the mouth and nostrils of a dental patient, there is a masking or neutralizing of otherwise objectionable odors. Such odors in part may be produced by the high speed cutting operation and in part by decomposing protein material within the oral cavity. It should be borne in mind that it is not at all uncommon at the present to employ speeds at least as great as, if not greater than 300,000 revolutions per minute. It has been noted that burs operated at such speed produce cuttings of a particulate size so small as to produce an unpleasant organic odor sensible to a dental patient.

Stabilization of the volatile flavoring substances is desirable. This is accomplished by adding a viscosity-increasing agent. For this purpose a non-toxic glycol component may be added to the flavoring in an amount from about 5% to about 40% of the total mixture. Non-toxic glycols or polyglycol, of which the specific compounds glycerol, propylene glycol, polyethylene glycol and others are desirable examples. The function of the glycol compound is one of retaining the volatile substances in a relatively stable condition in the porous body by imparting elevated viscosity characteristics and retardent effects on the flavoring substances. In the latter respect these compounds reduce the rate of volatization. This prevents too rapid atomization of the oils into the airstream, thus avoiding too short a useful life or too rapid discharge of the flavoring substance in its function of imparting an agreeable odor to air moving through the passage of body 40.

Other volatile substances, aside from those previously named and which are considered useful in this system, may comprise a number of synthetic flavoring compounds, among which are methyl salicylate and isobornyl acetate and others of similar nature.

In the formation of porous body 40 it has been noted that the surface of passage 44 is netlike or reticulated. The volatizing substance entrapped within or carried by absorbent body 40 tends to work axially toward this passage surface as the surface is wiped by the air moving through the apparatus. During "off" periods with respect to air flow, the volatizing oil in body 40 appears to migrate or work its way throughout body 40 and to arrive at the walls of passage 44. Since such "off" periods are fairly common during dental preparation, the discharge of agreeably odorized air is quite uniform.

In FIG. 6, which is a cross sectional view of an alternative form of porous body, the canister or cassette 46, containing body 50, has a central passage 52 somewhat star-shaped in cross section. By this means the surface of the internal passage through the cartridge is maximized and, of course, the transfer of the volatizing oil to the through-flowing air is increased as compared with a straight-bore passage 44. It will be apparent that other alternatives and modifications may be employed without departing from the spirit of the invention as defined hereafter.

I claim:

1. Apparatus for treating air under pressure moving in a flexible conduit between a source and a point of discharge, comprising
   a casing having hollow stem means at opposite ends adapted to permit the casing to be operatively coupled in line with and carried by such a flexible conduit. said hollow stem means constituting opposed adit and exit openings for air flow through said casing,
      said casing consisting of two mating parts removably joined in an air-tight manner in the vicinity of its midpoint,
      each said casing part having a ported boss instanding therein adjacent to and in communication with the hollow stem means; and
   a porous body of absorbent cellular material substantially filling the chamber within said casing and extending from end-to-end thereof,
      said body having a longitudinal air passage of a length greater than the disstance between said bosses, the ends of said passage being mated with the instanding bosses.

2. The apparatus of claim 1 in which the casing is cylindrical and the adit and exit openings and passage therebetween are disposed in the longitudinal axis of the casing.

3. Apparatus according to claim 2 in which the absorbent body comprises a replaceable encased canister substantially filling said casing.

References Cited

UNITED STATES PATENTS

| | | | |
|---|---|---|---|
| 1,238,068 | 8/1917 | Slater et al. | 21—74UX |
| 2,614,820 | 10/1952 | Boydjieff | 21—74UX |
| 2,919,981 | 1/1960 | Calva | 261—95X |
| 3,169,839 | 2/1965 | Calva | 261—95X |

MORRIS O. WOLK, Primary Examiner

B. S. RICHMAN, Assistant Examiner

U.S. Cl. X.R.

21—55, 122, 123; 239—57; 261—95